(12) United States Patent
Li et al.

(10) Patent No.: US 6,345,279 B1
(45) Date of Patent: Feb. 5, 2002

(54) METHODS AND APPARATUS FOR ADAPTING MULTIMEDIA CONTENT FOR CLIENT DEVICES

(75) Inventors: Chung-Sheng Li, Ossining, NY (US); Rakesh Mohan, Stamford, CT (US); John R. Smith, New Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/298,576

(22) Filed: Apr. 23, 1999

(51) Int. Cl.$^7$ ............................................. G06F 17/30
(52) U.S. Cl. ................ 707/104; 707/3; 707/5; 707/10; 707/501; 707/514; 709/224; 709/231; 709/217
(58) Field of Search ............................ 707/103, 3, 102, 707/10, 513, 104, 5, 501, 203, 514; 709/224, 203, 217, 226, 231, 232, 227, 246, 235; 370/252; 713/201

(56) References Cited

U.S. PATENT DOCUMENTS

| | | | | |
|---|---|---|---|---|
| 5,636,216 A | * | 6/1997 | Rox et al. | 370/402 |
| 5,646,982 A | * | 7/1997 | Hogan et al. | 379/89 |
| 5,712,907 A | * | 1/1998 | Wegner et al. | 379/112 |
| 5,724,355 A | * | 3/1998 | Bruno et al. | 370/401 |
| 5,999,525 A | * | 12/1999 | Krishnaswamy et al. | 370/352 |

OTHER PUBLICATIONS

U.S. application No. 09/413,515, Li et al., filed Oct. 6, 1999.
R. Mohan et al., "Adapting Multimedia Internet Content for Universal Access," IEEE Transactions on Multimedia, vol. 1, No. 1, pp. 1–35, Mar. 1999.
R. Mohan et al., "Multimedia Content Customization for Universal Access," SPIE East—Multimedia Storage and Archiving Systems III, Boston, MA, 9 pages, Nov. 1998.
J.R. Smith et al., "Content–based Transcoding of Images in the Internet," IEEE Inter. Conf. on Image Processing (ICIP–98), Chicago, IL, 5 pages, Oct. 1998.

(List continued on next page.)

Primary Examiner—Jean M. Corrielus
(74) Attorney, Agent, or Firm—Ryan, Mason & Lewis, LLP; Robert P. Tassinari, Jr.

(57) ABSTRACT

A method of adapting multimedia content to a client device, wherein the multimedia content includes one or more items and the client device has capabilities and resources associated therewith, is provided. The method includes transcoding the multimedia content into a plurality of transcoded content versions, wherein the plurality of transcoded content versions have different modalities and resolutions associated therewith. Next, the transcoded content versions that are not compatible with client device capabilities are filtered out. Then, at least a portion of the resources associated with the client device are allocated among the one or more items of the multimedia content. Lastly, one or more of the transcoded versions of the multimedia content are selected to generate a customized content based on allocation of the client device resources.

31 Claims, 5 Drawing Sheets

OTHER PUBLICATIONS

J.R. Smith et al., "Transcoding Internet Content for Heterogeneous Client Devices," Proc. IEEE Inter. Symp. on Circuits and Syst. (ISCAS), Special Session on Next Generation Internet, 4 pages, May 1998.

C–S. Li et al., "Multimedia Content Description in the InfoPyramid," Proc. ICASP'98, Special Session on Signal Processing in Modern Multimedia Standards, Seattle, WA, 4 pages, May 1998.

S. Paek et al., "Detecting Image Purpose in World Wide Web Documents," Symp. on Electronic Imaging: Science and Technology—Document Recognition, San Jose, CA, 8 pages, Jan. 1998.

T.W. Bickmore et al., "Digestor: Device–independent Access to the World Wide Web," Proc. of the 6th International WWW Conference, pp. 1–10, 1997.

G.C. Vanderheiden, "Anywhere, Anytime (+Anyone) Access to the Next Generation WWW," Proc. of the Sixth Int'l WWW Conference, pp. 1–11, 1997.

A. Ortega et al., "Soft Caching: Web Cache Management Techniques for Images," IEEE Signal Processing Society 1997 Workshop on Multimedia Signal Processing, Princeton, NJ, pp. 1–8, Jun. 1997.

A. Fox et al., "Reducing WWW Latency and Bandwidth Requirements by Real–time Distillation," Proc. of the 5th International WWW Conference, 12 pages, 1996.

A. Fox et al., "Adapting to Network and Client Variability Via On–demand Dynamic Distillation," ASPLOS–VII, Cambridge, MA, pp. 1–11, Oct. 1996.

* cited by examiner

METHODS AND APPARATUS FOR ADAPTING MULTIMEDIA CONTENT FOR CLIENT DEVICES

CROSS REFERENCE TO RELATED APPLICATIONS

The present application is related to U.S. patent application Ser. No. 09/413,515, entitled: "Method and Apparatus For Transcoding Multimedia Using Content Analysis," filed in the names of Li et al. on Oct. 6, 1999, which claims priority to U.S. provisional patent application Ser. No. 60/103,303, entitled: "Method and Apparatus For Transcoding Multimedia Using Content Analysis," filed in the names of Li et al. on Oct. 6, 1998.

FIELD OF THE INVENTION

The present invention relates to delivery of multimedia content to client devices and, more particularly, to methods and apparatus for adapting such multimedia content for diverse client devices.

BACKGROUND OF THE INVENTION

Web documents delivered on the Internet are multimedia presentations that may include video, images, graphics, text and audio. Due to the recent rapid growth of devices that are connected to the Internet, there is a growing demand for providing universal access to such multimedia content to a wide variety of devices over a wide range of network environments. For example, personal computers on a local area network (LAN), personal digital assistants (PDAs) on dial-up modems and smart cellular phones have drastically different client resources in terms of, for example, screen size, resolution, color depth, network bandwidth and computing power. Internet users also vary in their ability to pay for Internet services and in the time they are ready to wait for a page to download. Therefore, to provide universal access to the Internet, multimedia delivery methods need to account for the composite nature of Web documents, and the variety of client platform capabilities, user interests, network constraints and authoring policies.

In this context, video-conferencing systems have been proposed that adjust the bandwidth available to the client by selecting a suitable compression factor or codec. In these systems, only a single type of multimedia item (namely video) is considered. Also, clients that can not handle video are not considered.

One option for content adaptation is to manually develop multiple versions of multimedia content, each suitable for a class of client devices. Given the variety of client devices, it is difficult for content publishers to anticipate and accommodate the wide spectrum of client capabilities. For composite multimedia documents, such as Web pages, a number of systems have been proposed that employ a proxy between the Web server and the client. For example, various proxy approaches are described in: J. R. Smith, R. Mohan, and C-S. Li, "Transcoding Internet Content for Heterogeneous Client Devices," In Proc. IEEE Inter. Symp. on Circuits and Syst. (ISCAS), Special Session on Next Generation Internet, June 1998; A. Fox, S. D. Gribble, E. A. Brewer, and E. Amir, "Adapting to Network and Client Variability Via On-demand Dynamic Distillation," In ASPLOS-VII, Cambridge, Mass., October 1996; A. Ortega, F. Carignano, S. Ayer, and M. Vetterli, "Soft Caching: Web Cache Management Techniques for Images," In IEEE Workshop on Multimedia Signal Processing, pg. 475–480, Princeton, N.J., June 1997; Intel Quick Web accessible on the Internet at http://www.intel.com/quickweb; Spyglass Prism accessible on the Internet at http://www.spyglass.com/products/prism; A. Fox and E. A. Brewer, "Reducing WWW Latency and Bandwidth Requirements by Real-time Distillation," In Proc. Of the 5th International WWW Conference, 1996; and T. W. Bickmore and B. N. Schilit, "Digestor: Device-independent Access to the World Wide Web," In Proc. Of the 6th International WWW Conference, 1997. The proxy distills, or transcodes, the content from the Web server. This transcoding is primarily limited to the compression of images, or a reduction of their size or color space. These systems do not consider transcoding into different modalities. The image compression and size reduction policies are static and do not dynamically account for resources on the client.

SUMMARY OF THE INVENTION

The present invention adapts multimedia content, e.g., Web documents, to optimally match the capabilities of the client device requesting it. Each Web document is a set of items, each of which is authored in a particular modality such as text or image. Each of these content items is then transcoded into multiple resolution and modality versions so that they can be rendered on different devices. For example, a video item is transcoded into a selected set of images so that it can be rendered on a device not capable of displaying video. Each version of a content item requires different resources from the client device. The invention ensures that the resource requirements for the entire document, as given by the sum of the resource requirements of its constituent items, can be met by the requesting client. The invention allocates the resources on the client among the items in the document. This resource allocation results in the selection of appropriate resolution or modality of the content items. If the client has limited resources, e.g., such as a PDA or pager, some of the content items may not get any resources assigned and thus not be delivered to the client.

In an embodiment of the invention, as will be explained, three technologies are employed to provide such multimedia content adaptation: (i) a progressive data representation scheme referred to as the InfoPyramid as described in C-S. Li, R. Mohan and J. R. Smith, "Multimedia Content Description in the InfoPyramid," Proc. ICASP'98, Special Session on Signal Processing in Modern Multimedia Standards, Seattle, Wash., May 1998, the disclosure of which is incorporated herein by reference; (ii) a set of transcoding modules for converting modality or resolution; and (iii) an adaptation process that selects the best representation to meet the client capabilities while delivering the most value to the client.

The present invention provides many advantages over prior solutions. For example, content is dynamically adapted to the client device allowing a wider variety of multimedia content and of client devices to be properly supported. Also, in accordance with the invention, a content author has control over the adaptation process. The content author can edit and replace the transcoded versions of content items generated by the automated transcoding systems. This control of the customization overcomes problems of publisher control and copyright issues faced by transcoding proxies.

Further, the invention permits content to be authored in XML (Extensible Markup Language, as is known in the art), allowing the author to provide more information to the transcoding and adaptation systems than can be deduced from an HTML (hyper text markup language) page. One benefit of the server-based system of the invention is that due to the guidance provided by the author, a significantly greater level of customization can be performed than is possible in previous transcoding proxies. Still further, the invention permits the transcoded versions of the content items to be generated prior to any requests. Thus, the invention can handle media items such as video and audio which are difficult to handle in conventional proxies. This off-line transcoding also leads to lower response latencies than proxies. Also, the server shares the benefit of transcoding proxies in speeding content delivery as the customized content is often much smaller than the original content.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

It is to be appreciated that the term "processor" as used herein is intended to include any processing device, such as, for example, one that includes a CPU (central processing unit). The term "memory" as used herein is intended to include memory associated with a processor or CPU, such as, for example, RAM, ROM, a fixed memory device (e.g., hard drive), a removable memory device (e.g., diskette), etc. In addition, the term "input/output devices" or "I/O devices" as used herein is intended to include, for example, one or more input devices, e.g., keyboard, for making requests for multimedia content and inputting data to the processing unit, and/or one or more output devices, e.g., CRT display and/or printer, for presenting requested multimedia content and providing results associated with the processing unit. It is also to be understood that various elements associated with a processor may be shared by other processors. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Figure 1:
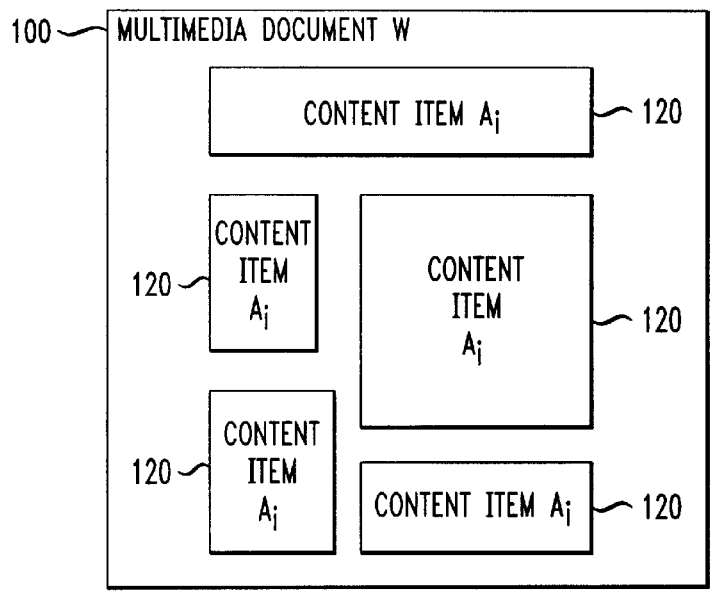
FIG. 1 is a diagram illustrating an example of a multimedia document.

Referring to FIG. 1, an example of a multimedia document is shown. As is well known, a Web user (client) makes a request from his client device for some particular Web document(s) or other multimedia content which may contain video, images, graphics, text, audio. The request is sent to a Web server which satisfies the request by returning the requested document to the client. As shown, a multimedia document W, denoted as reference numeral 100, is composed of a number of content items $A_i$, denoted as reference numeral 120, where i=1, 2, . . . , n. Thus, the multimedia document may be represented as $W=\{A_i\}$. Each content item $A_i$, can be an atomic unit of media such as, for example, an image. A content item $A_i$ can also be composed of other items. For example, a document can have a number of stories as content items, and each story item may be composed of image items, text items, etc.

Figure 2:
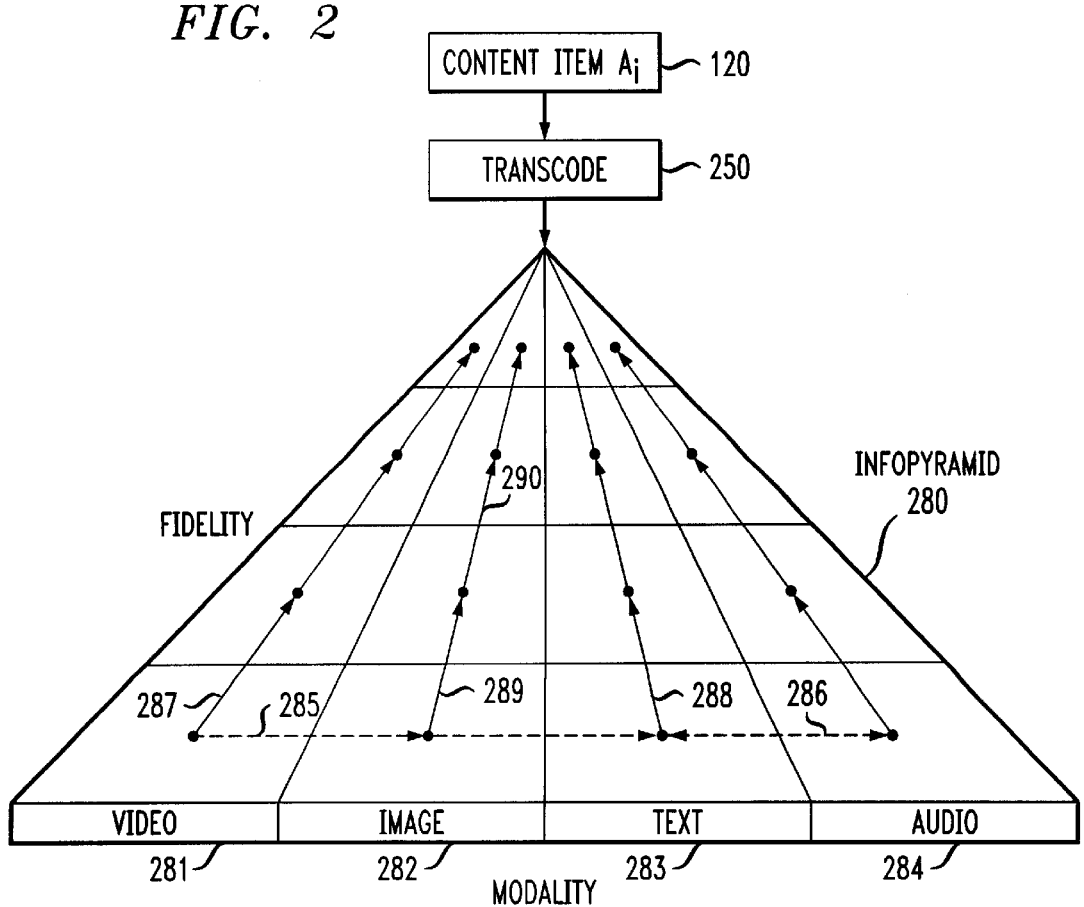
FIG. 2 is a diagram illustrating transcoding a content item into an InfoPyramid.

Referring to FIG. 2, a diagram illustrating an example of transcoding a content item into an InfoPyramid according to the invention is shown. Particularly, a content item 120 is transcoded, in process 250, into an InfoPyramid 280. For each original content item $A_i$, an InfoPyramid represented as $M_i=\{M_{ij}\}$, j=0, $m_i$, is computed by transcoding $A_i$ into j versions with different resolutions and modalities. The original version is denoted as $M_{i0}=A_i$. A null version, which corresponds to an item being deleted from the delivered content, is denoted as:

$$M_{im_i}=\phi. \qquad (1)$$

The transcoding process 250 can convert the input modality associated with the content item to a new modality such as, for example, text to audio, or audio to text. Alternatively, the transcoding process can summarize, compress, or elaborate on the content within the given modality of the input data such as, for example, by image compression or text summarization. Further, it is to be appreciated that transcoding processes may alternatively be performed in accordance with the techniques described in U.S. patent application Ser. No. 09/413,515, entitled: "Method and Apparatus For Transcoding Multimedia Using Content Analysis," filed in the names of Li et al. on Oct. 6, 1999, which claims priority to U.S. provisional patent application Ser. No. 60/103,303, entitled: "Method and Apparatus For Transcoding Multimedia Using Content Analysis," filed in the names of Li et al. on Oct. 6, 1998, the disclosure of which is incorporated herein by reference.

The InfoPyramid 280 can be viewed as a generalization of multi-resolution representations, e.g., Gaussian image pyramids, to multimedia. The InfoPyramid provides a multimodal, multi-resolution representation hierarchy for multimedia, for example, as described in the above-referenced C-S. Li, R. Mohan and J. R. Smith, "Multimedia Content Description in the InfoPyramid," Proc. ICASP'98, Special Session on Signal Processing in Modem Multimedia Standards, Seattle, Wash., May 1998. The InfoPyramid 280 is a data structure in which the multiple representations of a multimedia item can be organized into a pyramid-like structure, as illustrated in FIG. 2. The cells of the pyramid correspond to different representations of the objects using different modalities such as, for example, video 281, image 282, audio 283 and text 284, and fidelities such as in the range of full-resolution (bottom of pyramid) to low-resolution (top of pyramid). A specific version of a multimedia item can be referred to by one of the cells. The InfoPyramid may include procedures and rules for translating and summarizing (transcoding) between modalities and resolutions. The InfoPyramid may also contain meta-data for each constituent version such as, for example, size, color, bandwidth requirements, publisher preferences, etc.

The transcoding process 250 populates the InfoPyramid 280 structure with multi-resolution, multi-modal versions of the content item, as explained herein. The transcoding process 250 can be performed on a version by following the transcoding paths in FIG. 2, for example, as denoted by reference numerals 285 through 290. By following the horizontal paths, e.g., paths 285 and 286, a version can be translated to another version in a new modality. For example, text can be converted to audio in path 286. Similarly, video can be converted to images in path 285. By following the vertical paths, e.g., paths 287, 288, 289 and 290, a version can be changed into versions at different fidelities. For example, text passages can be summarized in path 288, video can be compressed in path 287 and/or images can be compressed in path 289. Furthermore, the image can be compressed to a greater degree in path 290. Such transcoding processes can be done in a "lazy" fashion, i.e., the actual transcoding need not be performed, but rather, only a place holder for the transcoded version can be created and the meta-data filled in. The actual version is generated only if required.

Some exemplary transcoding processes 250 are listed below by modality of the version and the conversions performed to generate versions at different resolutions and modalities:

(i) images
  resolution—spatial size reduction, color depth reduction, lossy/lossless compression
  modality—related text, embedded text, semantic labels;
(ii) video
  resolution—spatial and temporal resolution, lossy/lossless compression
  modality—key-frame images, audio track, closed caption;
(iii) text
  resolution—key-terms, text summarization, document headings
  modality—speech synthesis, language translation;
(iv) audio
  resolution—bit-rate reduction, sampling rate change, stereo to mono
  modality—speech recognition.

That is, such known transcoding operations are capable of transcoding multimedia content in a variety of ways. Some illustrative examples of the exemplary conversions mentioned above include: (i) compressing data with or without information loss; (ii) reducing the size or resolution of the data such as by spatial reduction; (iii) reducing the color content of the data such as reducing the number of colors; (iv) summarizing content such as text passages and video sequences; (v) reducing or expanding the amount of data or altering the fidelity of the information; (vi) translating the data to different modalities such as text to speech, video to images, and speech to text; (vii) translating text to a different language such as English to Japanese; and (viii) removing, substituting, blocking, emphasizing or de-emphasizing individual multimedia objects, modal elements, or other content.

Figure 3:
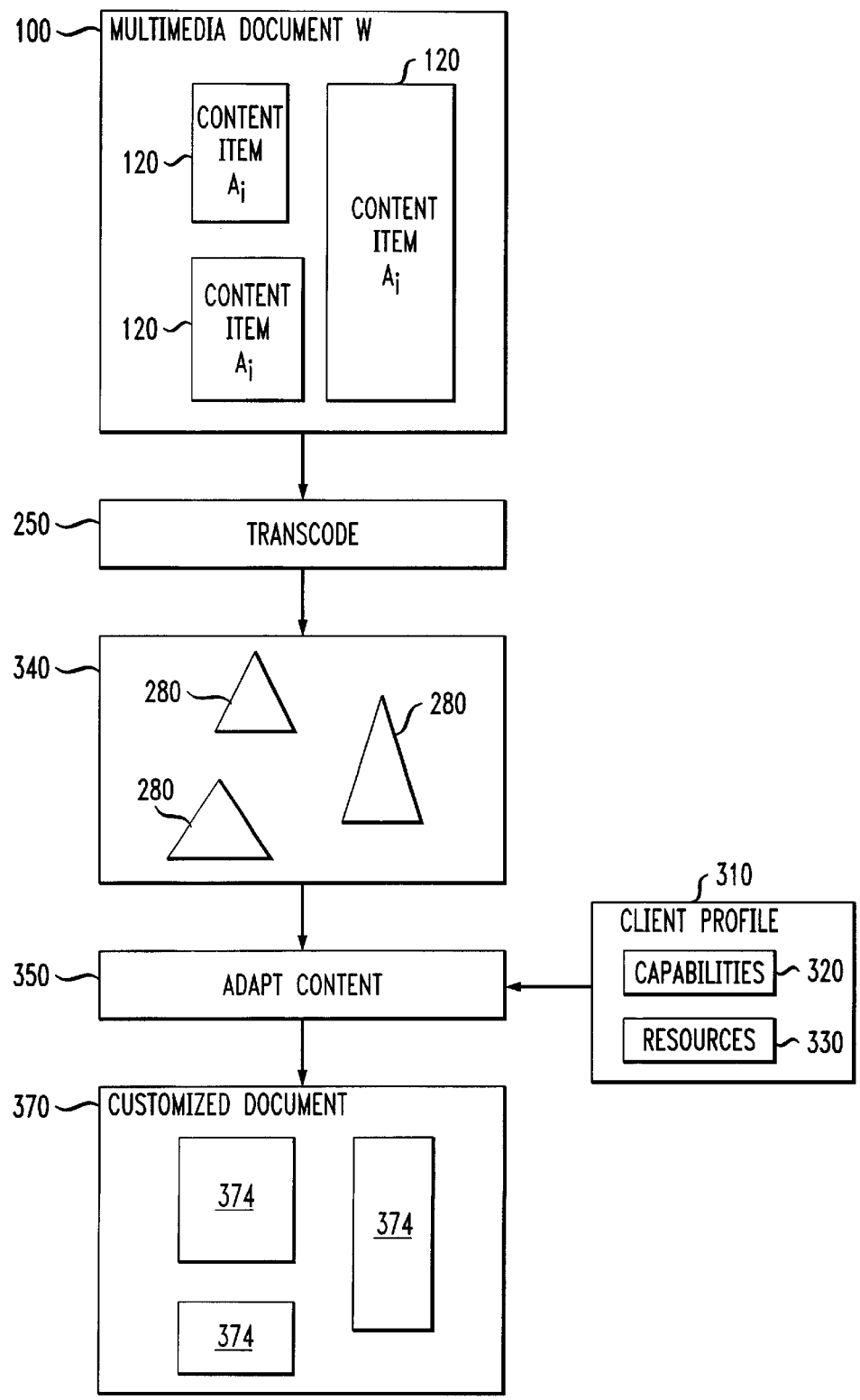
FIG. 3 is a flow chart illustrating a method of adapting a document to a client device according to an exemplary embodiment of the invention.

Referring to FIG. 3, a flow chart of a method 300 of adapting a multimedia document 100 to a client device according to the invention is shown. A client device is characterized by a client profile 310. As shown in FIG. 2, the content items 120 of a multimedia document 100 are transcoded (250) into multiple modality and fidelity versions to generate a set 340 of InfoPyramids 280.

A client device is characterized by its profile 310 which lists the capabilities 320 and resources 330 of the device. The types of client devices that can access the Internet are rapidly expanding beyond the typical workstation on a LAN for which most multimedia Internet content is authored.

A client may have a different number of capabilities 320 and resources 330. It is to be appreciated that the term "capability" is the ability for a client device to handle a particular media type. Examples of capabilities that may be specified include: (i) screen color; (ii) audio capability; (iii) video capability; (iv) image display capability; (v) software such as video decompression; and (vi) hardware such as a sound card, to name a few. So, by specifying the capabilities that a client device has, it is implied that capabilities not specified do not exist on the client device. For example, a handheld personal computer (HPC) may not be capable of displaying video and a PDA may not be capable of displaying color images. The "resources" of a client can be divided up among several items on a Web page. Examples of resources are: (i) screen size including width, height and area; (ii) bandwidth, for example, network bandwidth; (iii) memory and other client storage capacity; (iv) wait time (including preferred and limits) as determined by the product of the bandwidth and the time a client is ready, willing or able to wait to receive the complete document; (v) payment ability (including preferred and limits), that is, money client is ready, willing or able to pay for the document, to name a few.

The client device profile can be obtained by a number of mechanisms. For example, the User-Agent fields in the HTTP (hyper text transport protocol) request header contain information about the browser and often the operating system. Also, Windows-CE devices specify the screen size, color depth and processor. Standardization efforts are under way to allow these request fields to contain more information about the client device. Further, many sites require users to log-in or place cookies at the user location allowing client capabilities to be retrieved from stored profiles. The client may also specify their capabilities explicitly, for example, through forms or applets.

A content adaptation process 350 uses the client profile 310 to select from among the InfoPyramids 280 the versions 374 that best satisfy the particular client profile. These selected versions are rendered into a document 370 which is an adaptation (i.e., customization) of the original multimedia document 100. The client device receives the customized document 370.

Figure 4:
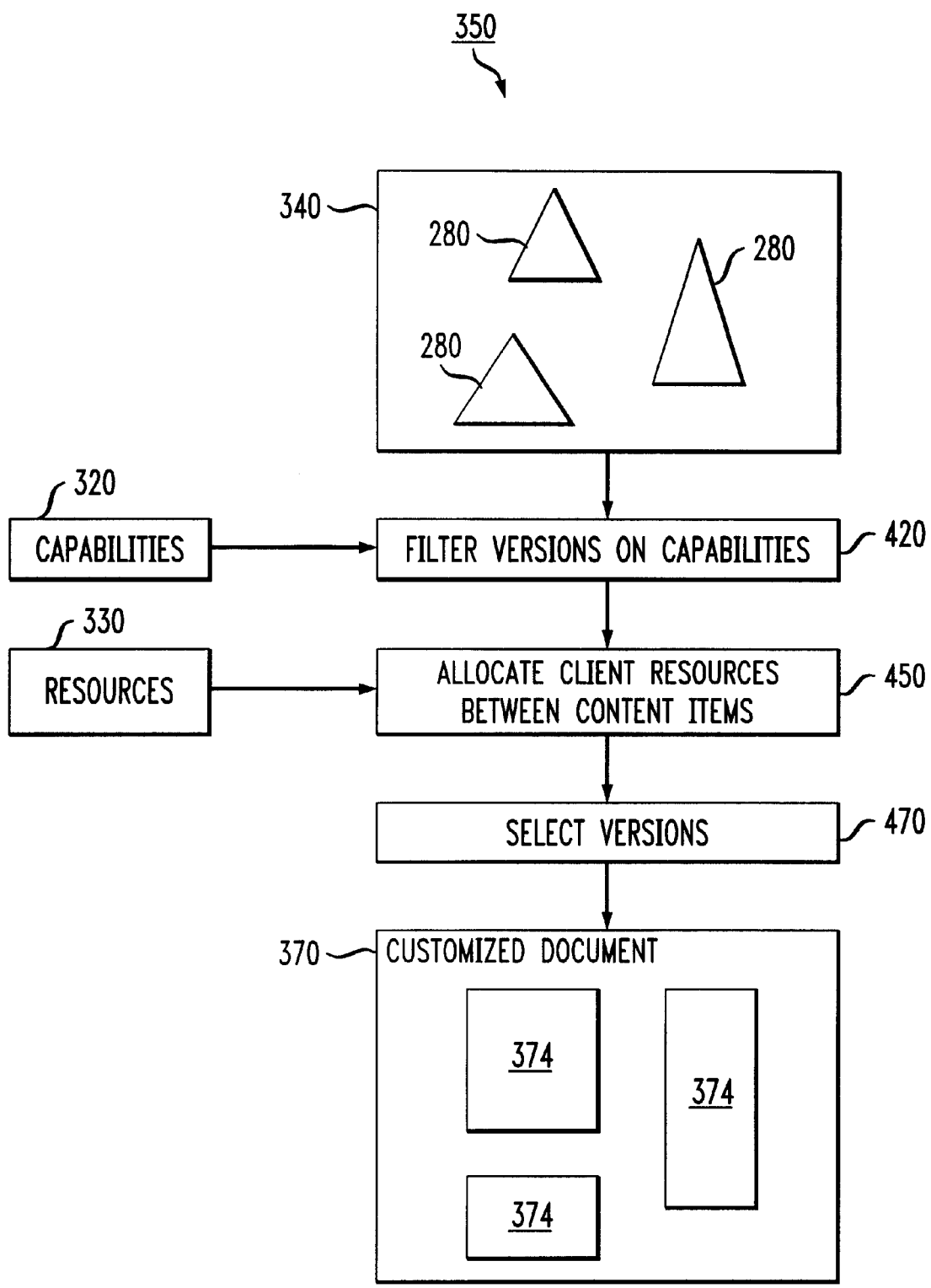
FIG. 4 is a flow chart illustrating an adaptation process according to an exemplary embodiment of the invention.

Referring to FIG. 4, a flow chart illustrating an adaptation process 350 according to the invention is shown. First, in step 420, the versions from the InfoPyramids 280 that do not meet client capabilities 320 are filtered out. For example, all versions that are in video modality can be filtered out if the device is not capable of displaying video. Similarly, all versions that are color images can be filtered out for a device that has only a black and white or gray-level screen.

Next, in step 450, the client resources are allocated between the InfoPyramids 280 and the content items. The resources can be allocated by using any allocation resource policy. For example, the resources can be distributed in proportion to the resources used by the original versions. A method for allocating resources may be based on optimization, as will be explained in the context of FIG. 5. Then in step 470, the resources allocated for each InfoPyramid are used to select the appropriate version 374, which has not been previously filtered out in step 420, to render the customized multimedia document 370.

Figure 5:
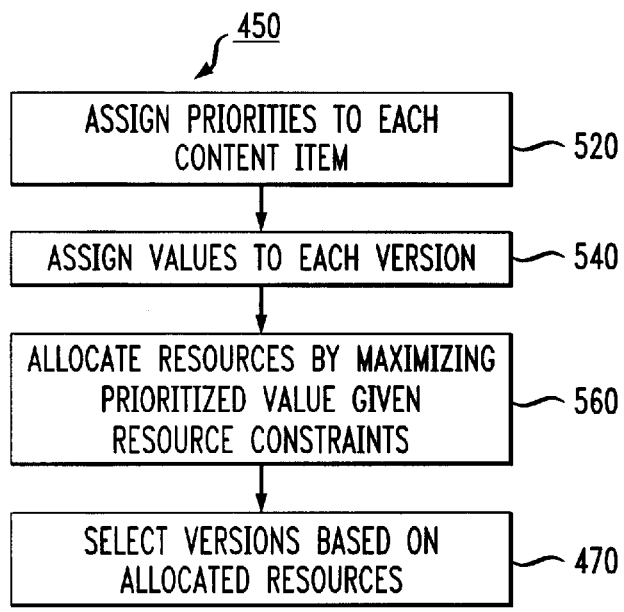
FIG. 5 is a flow chart illustrating a method of obtaining an adaptation process according to an exemplary embodiment of the invention.

Referring to FIG. 5, a flow chart illustrating a method 450 of allocating client resources using optimization according to the invention is shown. First, in step 520, each content item is assigned a priority. The author of the Web document may have a mental priority ordering of the items in the document. The priorities may be assigned by the author of the page. Many Internet applications, such as search engines, customized news sites, etc., generate documents dynamically in response to a user request. In these applications, there is often a priority implicitly assigned to the items. For example, in image search engines, the match scores of the returned images serve as priorities. Priorities can be assigned based on match scores for various dynamically generated pages. For classes of multimedia documents, priorities can be assigned on attributes of content items. For example, titles can be given a higher priority than headings which can be given a higher priority than paragraphs. Content analysis or heuristics give hints to semantics or purpose of various content items. Such content analysis, for example, is described in S Paek and J. R. Smith, "Detecting Image Purpose in World Wide Web Documents," In Symp. On Electronic Imaging: Science and Technology—Document Recognition, San Jose, Calif., January 1998, the disclosure of which is incorporated herein by reference, while heuristics are, for example, described in J. R. Smith, R. Mohan and C-S. Li, "Content-based Transcoding of Images in the Internet," In IEEE Inter. Conf. On Image Processing (ICIP-98), Chicago, Ill., October 1998, the disclosure of which is incorporated herein by reference. For example, one can categorize images as pictures, graphics, advertisements, etc. These categories can be used to assign priorities. Also, priority may be assigned to items based on subjective or objective importance. In any case, let $P_i$ be the priority assigned to item i.

Next, in step 540, each version of a content item in an InfoPyramid is assigned a value. A value is a subjective measure of fidelity and may be represented as:

$$V(M_{ij}) = \frac{\text{perceived value of transcoded version } M_{ij}}{\text{perceived value of original } M_{i0}} \quad (2)$$

where:

$$V \in [0, 1], \quad (3)$$

$$V = \begin{cases} 1 & \text{for original item } M_{i0} \\ 0 & \text{when the item is excluded from } M_{im_i} \end{cases}.$$

V provides a measure of fidelity that is applicable to transcodings of media at multiple resolutions and multiple modalities. This also allows comparison of content items that are in different media types. The value V can either be assigned by the author for each transcoding, or a functional relation between V and R (i.e., the resource utilized) can be defined. In the special case where a distortion D of all the versions can be measured, and the distortion for the null version is assumed to be infinite, V can be computed as:

$$V = \frac{1}{1+D}. \quad (4)$$

The prioritized value of InfoPyramid $M_i$ is defined as $V_i^P = P_i V_i$. Next, in step 560, the client resources 320 are allocated by maximizing, or at least substantially maximizing, the sum of prioritized values of the InfoPyramids of all content items such that the client resources are not exceeded, i.e.:

$$\max_i \left\{ \sum_i V_i^P \right\} \text{ such that } \sum_i R_i \leq R_{client} \quad (5)$$

where $V_i \in \{V(M_{ij})\}$ and $R_i \in \{R(M_{ij})\}$ are the values and the resources used by the $i^{th}$ item $M_i$ of the multimedia document. While $V_i$ and $R_i$ are discrete, we will first consider them to be continuous, and then deal with the discrete case. $R_{client}$ is the maximum resource available at the client.

Let the value $V_i$ be some function of the resource $R_i$, i.e., $V_i = f_i(R_i)$. We convert the above constrained optimization problem (equation (5)) to an unconstrained optimization problem by considering the Lagrangian optimization technique described in R. Fletcher, "Practical Methods of Optimization," John Wiley & Sons, 1987. Using the Lagrangian technique, equation (5) may be expressed as:

$$L(R, \lambda) = \left\{ \sum_i V_i + \lambda \left( R_{client} - \sum_i R_i \right) \right\} \text{ with } \lambda \geq 0. \quad (6)$$

Then, if $R_0$ is an optimal solution to equation (5), there exists a $\lambda_0$ such that $\nabla L(R, \lambda) = 0$. Thus, the candidate solutions for the maximum are given by:

$$\frac{\partial L}{\partial R_1} = \frac{\partial L}{\partial R_2} = \cdots \frac{\partial L}{\partial R_i} = \cdots \frac{\partial L}{\partial \lambda} = 0. \quad (7)$$

Given that the items and their values are independent of each other, we get:

$$\frac{\partial L}{\partial R_i} = \frac{d f_i(R_i)}{d R_i} - \lambda. \quad (8)$$

Therefore, the candidate solutions to equation (5) are given by:

$$\frac{d f_1(R_1)}{d R_1} = \frac{d f_2(R_2)}{d R_2} \cdots \frac{d f_i(R_i)}{d R_i} \cdots = \lambda. \quad (9)$$

First we consider analytic functions. Content value, as an alternative distortion, makes it possible for authors or users to specify value judgements about various transcoded versions of the content. However, manually assigning the values is not a practical proposition in most scenarios. To mitigate this problem, we introduce functional mappings between content value and resource utilization.

Let us assume a function $f$, $V_i = f_i(V_i)$. Note that $f$, and therefore, the solution, is dependent on the choice of units for R. If f is concave, equation (9) gives us the optimal solution. We will first however consider the case when f is not concave followed by the case when it is concave.

Non-concave case: We will limit the discussion to the case when $f$ is either linear or convex. Let us assume that the value of an item is linearly proportional to the resource that it utilizes, i.e., $V_i = c_i R_i$. From the definition of V we have that $f_i(R_i) = 0$ when item i is absent from the delivered document, i.e., $R_i = 0$ and $f_i(R_i) = 1$ for the original version of item i, i.e., $R_i = R_i^{max}$. Thus:

$$c_i = \frac{1}{R_i^{max}}. \quad (10)$$

We term $c_1$ to be the resource utilization factor RUF because it measures how well the item i utilizes its resources to deliver value. It is evident that a greedy algorithm that allocates resources to items in the order of their RUFs gives the optimal resource allocation:

1. Store items in order of decreasing RUF, c.
2. Starting with the item with the largest RUF, allocate the maximum resources that each item can use until all the resources are depleted.

Similarly, the optimal resource allocation for any convex function $f$ is also a greedy algorithm.

Concave case: Let us consider the concave function $V_i=c_i \ln(1+R_i)$. We have defined f on $1+R_i$ to avoid negative $V_i$. For simplicity, we assume that R>>1 for most versions, and that R=1 is equivalent to the item being deleted, giving:

$$V_i = c_i \ln(R_i) = \frac{\ln(R_i)}{\ln(R_i^{\max})}. \quad (11)$$

We now get a resource utilization factor RUF of:

$$c_i = \frac{1}{\ln(R_i^{\max})}. \quad (12)$$

Using equation (9), we see that the resources are distributed among the items in proportion to their RUFs. Since, $V_i=c_i \ln(R_i)$ is concave (and the constraint is linear) this solution is optimal. In a similar manner, equation (9) yields the optimal solution for all other concave functions.

Now considering discrete values, since each item is transcoded into a limited number of versions, we may have no version that uses exactly the same resource as computed in the optimization process described above. To account for the discrete values, we use the following algorithm:

1. For each item i, let $R_i'$ be the resource selected by the optimization process. Select version j such that $R_{ij}<R_i'$ and $R_i'-R_{ij}$ is minimum.
2. Order the items in order of decreasing RUFs. Starting from the item with the highest RUF, while there are any resources left, assign to each item the version with the next highest value.

It is to be appreciated that step 2 needs to be performed only once.

Next we consider arbitrary functions. When the values $V_i$ are assigned, for example by the author, we may not have an analytical function $f_i(R_i)$ and thus will not be able to calculate:

$$\frac{d f_i(R_i)}{d R_i}. \quad (13)$$

Figure 9:
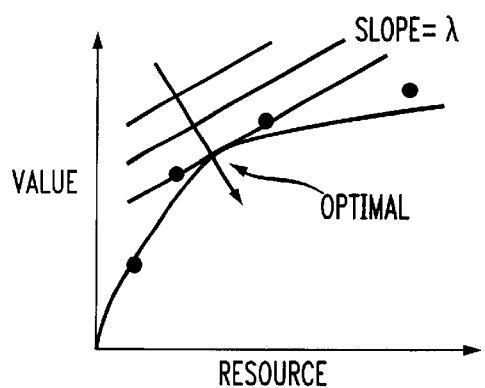
FIG. 9 is a graphical representation illustrating a resource allocation technique according to an exemplary embodiment of the invention.

For this case, we adapt a technique described in Y. Shoham and A. Gersho, "Efficient Bit Allocation for an Arbitrary Set of Quantizers," IEEE Trans. On Acoust., Speech, Signal Proc., 36(9):1445–1453, September 1998, the disclosure of which is incorporated herein by reference. For each Infopyramid $M_i$ of each item i, we plot the value $V_{ij}$ versus the resource utilized $R_{ij}$ of each version $M_{ij}$, as illustrated in FIG. 9. The optimal version $M_i'$ given by sweeping a line with slope $\lambda$ from the top-left to the bottom-right until it meets the concave hull of these points. As shown by equation (9) and as known in the above-referenced Shoham article, the optimal solution is given by the same slope $\lambda$ for all the different items i. Then, a binary search for $\lambda$ is performed such that:

$$\sum_i R_i \quad (14)$$

is close to but less than $R_{client}$. Points outside the concave hull are not in the solution space. For example, a text transcript of video may take more screen space but have less value, so it is out of the solution space.

Recall that $P_i$ is the priority assigned to item i by the author or the application. We then define the prioritized value of item i as $V_i^P=P_i V_i$. The goal is now to find:

$$\max_i \left\{ \sum_i V_i^P \right\} \text{ such that } \sum_i R_i \leq R_{client}. \quad (15)$$

Using this formulation, the following resource allocation strategies are similar to those described above but with prioritized values replacing RUFs:

1. If $f$ is linear or convex, the resources are assigned in a greedy manner in order of the prioritized values of the items.
2. If $f$ is logarithmic, the resources are assigned in proportion to the prioritized values of the items. In general, when $f$ is concave, equation (15) can be solved by the technique described above with respect to analytic functions.

When $f$ is not analytic, the value versus resource plot (FIG. 9) is replaced with $V_i^P=P_i V_i$ on the y-axis. The remainder of the algorithm is as described above with respect to arbitrary functions.

One common transcoding practice is to scale the size of all images by a constant factor: 0.75, 0.25, etc. One can argue that in the original Web document, the larger images were more important as more resources were given to them. We can model these intrinsic properties as proportional to ln(image size). Then, this ad-hoc policy of constant scaling is equivalent to allocating the client resources of screen area in proportion to the prioritized values of the images, and is optimal with the assumption that image value is a logarithmic function of its size.

Each content item i can be a composite item, i.e., a hierarchy of other content items. To account for composite items, we allocate resources using $V_i=f_i(R_i)$ where $f$ is a concave analytic function and the items i under consideration may be composite. The optimal resource $R_i'$ thus allocated to each composite item i is in turn used as the resource constraint for its constituent items. We then allocate this resource $R_i'$ among the children of the composite item i. This resource allocation is repeated until the items being considered are atomic (e.g., an individual media item such as an image). When we have priorities assigned to items, we similarly modify the resource allocation strategy as described above.

For a composite item, the number of its different versions is combinatorial in the number of its children items. Thus, it is not always practical to manually assign values to each version of a composite item.

As previously mentioned, a client may have a different number of capabilities and resources. Before we start the resource allocation process, we remove from consideration all the versions of items that a client is not capable of handling. Let there be r different resources $R^k_{client}$ that we have to consider. Then, the resource allocation problem can be stated as:

$$\max_i \left\{ \sum_i V_i \right\} \text{ such that } \sum_i R_i^k \leq R_{client}^k \text{ for all } 1 \leq k \leq r. \quad (16)$$

We first allocate each resource $R^k_{client}$ separately. Let $M_i^k$ be the version of item $M_i$ that is selected for resource k. We select only one version of an item to be delivered. We achieve this by the following algorithm:

1. For each item i find the set of resources $R_i = \{R^k(M_i^k)\}$ used by each of its versions selected for each of the resources.
2. For each item i find the version $M_{ij}$ that has the highest assigned value among all the versions and such that for all k, $R^k(M_{ij}) \leq R^k (M_i^k) \in R_i$. If no values have been assigned, since we define $V_i = f_i^k(R_i^k)$, the value of a version may be different for different resources. In that case, we choose a resource as the dominant resource, and use the values of the versions for that resource.

The above algorithm is guaranteed to select one version for each item without breaking the constraints of any of the r resources. However, the version so selected may not always be optimal. To find the optimal set, a search (e.g., combinatorial) may be required.

For finding the optimal content adaptation schemes we assumed that the content items on a Web page are independent of each other. This assumption may not hold in all cases. For example, for a news story, if the text to the story has to be discarded due to space limitations, then delivering the pictures for the story may not be very useful. One solution is to use composite items, as described above. We consider dependent items as composite items and allocate resources first to the composite item. This resource can then be allocated among the components of the composite item in an all-or-none manner. Another solution is to extend rate-distortion techniques for handling dependent blocks such as, for example, is described in A. Ortega and K. Ramchandran, "Rate-Distortion Methods for Image and Video Compression," IEEE Signal Processing Magazine, November 1998, to the value-resource framework.

Advantageously, given that client resource allocation is expressed in the form of the above optimization problem, any of the above described techniques may be employed. It is to be appreciated that the above techniques are also described in R. Mohan, J. R. Smith and C-S. Li, "Adapting Multimedia Internet Content for Universal access," IEEE Transactions on Multimedia, Vol. 1, No. 1, March 1999, the disclosure of which is incorporated herein by reference. It is further to be appreciated that techniques known to those ordinarily skilled in the art for computing the solution to this type of optimization problem may alternately be employed. Whichever technique is used to find the optimum value, the solution gives the amount of resource $R_i$ allocated to the InfoPyramid $M_i$ for content item $A_i$. Then, the versions are selected based on the resources that have been allocated (step 470).

Figure 6:
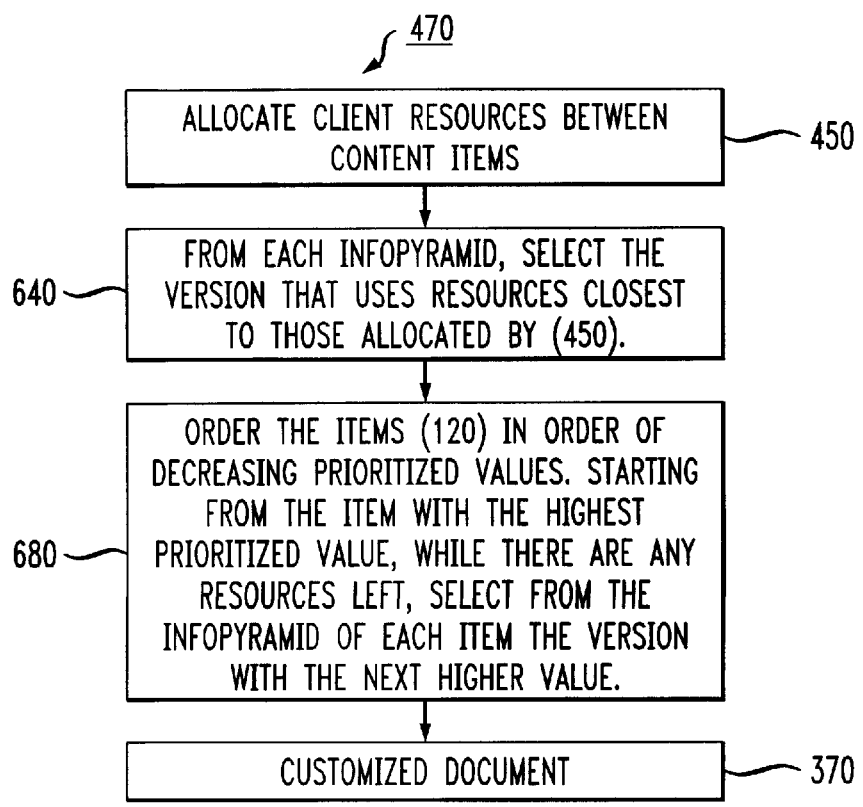
FIG. 6 is a flow chart illustrating a method of selecting versions of content items for a customized document according to an exemplary embodiment of the invention.

Referring to FIG. 6, a flow chart illustrating a method 470 of selecting versions based on the resources allocated (step 450) according to the invention is shown. For each InfoPyramid M, for content item $A_i$, let $R_i'$ be the resource allocated by step 450. In step 640, for each InfoPyramid, select version j such that $R_{ij} \leq R_i'$ and $R_1' - R_{ij}$ is a minimum. In step 680, the InfoPyramids are sorted in the order of decreasing prioritized values. Starting from the item with the highest prioritized value, while there are any resources left, select from the InfoPyramid of each item the version with the next highest value. Step 680 needs to be performed only once.

These selected versions 374 are rendered as the multimedia document 370 customized for the client device.

It is to be appreciated that in an alternative embodiment, the fidelity measure values, priorities, and the Infopyramids may be made part of the original multimedia document. If this is the case, then only the selection process (FIG. 6) need be performed to generate the customized multimedia document 370.

Figure 7:
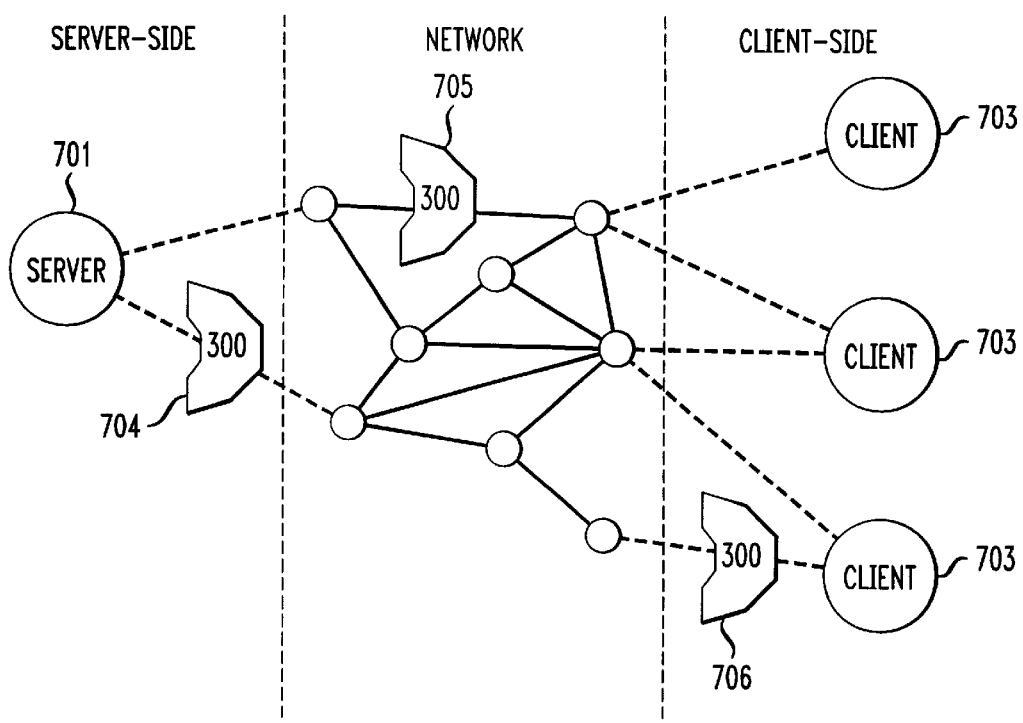
FIG. 7 is a block diagram illustrating deployment of an adaptation process in the Internet according to an exemplary embodiment of the invention.

Referring to FIG. 7, a block diagram illustrating an example of deployment of a content adaptation process 300 according to the invention in a client-server environment is shown. It is to be appreciated that the content adaptation process can be deployed on the server-side, the client-side, or in the network connecting the server and client. For example, the content adaptation process 300 may be implemented in a server 701 or a computing device 704 on the server-side. Further, the process 300 may be implemented in a proxy server 705 in the network. Still further, the process 300 may be implemented in a client device 703 or a computing device 706 on the client-side.

If the content adaptation process 300 is deployed at the proxy server 705, the proxy handles the requests from the client devices 703 for multimedia content (e.g., documents). The proxy retrieves the requested information from server(s) 701. Then, the process 300 running on the proxy adapts the retrieved content to the profile 310 of the requesting client device 703. The proxy 705 then delivers the customized document 370 to the client device 703. If the content adaptation process 300 is deployed at the server 701, the process 300 has direct access to the content at the server 701 and can store the InfoPyramids 280 on the server 701. If the content adaptation process 300 is deployed at the client-side computing device 706, the process 300 can adapt documents retrieved by the clients 703 from the server(s) 701. Alternatively, the process 300 may be distributed among two or more locations.

Figure 8:
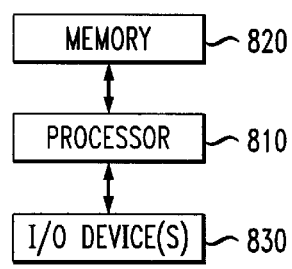
FIG. 8 is a block diagram illustrating an exemplary hardware architecture of a server or computing device for implementing the invention.

Referring to FIG. 8, a block diagram is shown of an exemplary hardware implementation for any of the computer systems used to implement the methodologies of the invention, e.g., server(s) 701, client devices 703, computing device 704, proxy server 705, and computing device 706. Each computer system includes a processor 810 coupled to a memory 820 and I/O device(s) 830. The processor 810 performs the functions associated with the methodologies described herein. The memory 820 is used by the processor for performing such functions and for storing results of the processes. The I/O device(s) may include one or more data input devices (e.g., keyboard, etc.) for inputting data (e.g., requests for multimedia content), and/or one or more data output devices (e.g., display) for presenting results associated with the functions performed in accordance with the methodologies described herein (e.g., displaying customized documents). Also, it is to be understood that more than one processor may be employed within any one computer system and various processors may share responsibility for executing processes associated with the invention. While the above embodiments illustrate a processor-based implementation of the invention, one of ordinary skill in the art will realize that other implementations may be used in whole or in part, e.g., application specific integrated circuits, special purpose circuitry, etc.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of adapting multimedia content to a client device, the multimedia content including one or more items and the client device having capabilities and resources associated therewith, the method comprising the steps of:

transcoding the multimedia content into a plurality of transcoded content versions, the plurality of transcoded content versions having different modalities and resolutions associated therewith;

filtering out the transcoded content versions that are not compatible with client device capabilities;

allocating at least a portion of the resources associated with the client device among the one or more items of the multimedia content; and selecting one or more of the transcoded versions of the multimedia content to generate a customized content based on allocation of the client device resources.

2. The method of claim 1, wherein the multimedia content includes at least one World Wide Web document.

3. The method of claim 1, wherein the multimedia content includes at least one of a video item, an image item, a graphics item, a text item, and an audio item.

4. The method of claim 1, wherein the transcoding step further includes the steps of:

separating the multimedia content into individual content items; and converting the individual content items to different resolutions and modalities.

5. The method of claim 1, wherein the capabilities associated with the client device include at least one of a color capability, an audio capability, a video capability, an image capability, and a text capability.

6. The method of claim 1, wherein the capabilities associated with the client device includes a decompression capability.

7. The method of claim 1, wherein the resources associated with the client device include at least one of a screen size, a bandwidth, a storage capacity, a content wait time ability, and a payment ability.

8. The method of claim 1, wherein the transcoding step includes separating the multimedia content into individual content items.

9. The method of claim 8, wherein the allocating step further includes assigning a priority to a content item.

10. The method of claim 9, wherein the priority is assigned by an author of the multimedia content.

11. The method of claim 9, wherein the priority is assigned by an application associated with the multimedia content.

12. The method of claim 9, wherein the priority is assigned in response to a user request.

13. The method of claim 9, wherein the priority is assigned in response to a match score.

14. The method of claim 9, wherein the priority is assigned as a function of the importance attributed to a content item.

15. The method of claim 9, wherein the allocating step further includes assigning a fidelity measure value to each content version.

16. The method of claim 15, wherein the allocating step further includes computing a product of the priority and the fidelity value for each content version.

17. The method of claim 15, further including the step of including the assigned fidelity measure value in the multimedia content.

18. The method of claim 9, further including the step of including the assigned priority in the multimedia content.

19. The method of claim 1, wherein the transcoded versions selected satisfy at least a portion of the resource allocations.

20. The method of claim 1, further including the step of organizing at least one of the one or more items and at least a portion of the transcoded content versions associated therewith in a data structure.

21. The method of claim 20, further including the step of including the data structure in the multimedia content.

22. The method of claim 1, wherein the resources allocated to at least a portion of the transcoded versions of the content items are a function of priorities.

23. A method of adapting multimedia content to a client device, the multimedia content including one or more items and the client device having capabilities and resources associated therewith, the method comprising the steps of:

transcoding the multimedia content into a plurality of transcoded content versions, the plurality of transcoded content versions having different modalities and resolutions associated therewith;

filtering out the transcoded content versions that are not compatible with client device capabilities;

allocating at least a portion of the resources associated with the client device among the one or more items of the multimedia content; and selecting one or more of the transcoded versions of the multimedia content to generate a customized content based on allocation of the client device resources;

wherein the transcoding step includes separating the multimedia content into individual content items, and wherein the allocating step further includes assigning a priority to a content item, assigning a fidelity measure value to each content version, computing a product of the priority and the fidelity value for each content version, and at least substantially maximizing a sum of the products for the content versions such that the resources associated with the client device are not exceeded.

24. The method of claim 23, wherein the maximizing step results in determining the portion of the resources associated with the client device which are allocated to each content item.

25. A method of adapting multimedia content to a client device, the multimedia content including one or more items and the client device having capabilities and resources associated therewith, the method comprising the steps of:

transcoding the multimedia content into a plurality of transcoded content versions, the plurality of transcoded content versions having different modalities and resolutions associated therewith;

filtering out the transcoded content versions that are not compatible with client device capabilities;

allocating at least a portion of the resources associated with the client device among the one or more items of the multimedia content; and selecting one or more of the transcoded versions of the multimedia content to generate a customized content based on allocation of the client device resources;

wherein the resources allocated to at least a portion of the transcoded versions of the content items are a linear scaling function of the resources that would otherwise be allocated to the items.

26. Apparatus for adapting multimedia content to a client device, the multimedia content including one or more items and the client device having capabilities and resources associated therewith, the apparatus comprising:

at least one processor operable to transcode the multimedia content into a plurality of transcoded content versions, the plurality of transcoded content versions having different modalities and resolutions associated therewith, to filter out the transcoded content versions that are not compatible with client device capabilities, to allocate at least a portion of the resources associated with the client device among the one or more items of the multimedia content, and to select one or more of the transcoded versions of the multimedia content to generate a customized content based on allocation of the client device resources; and memory, coupled to the at least one processor, for storing at least a portion of results associated with one or more of the operations performed in accordance with the at least one processor.

27. The apparatus of claim 26, wherein the multimedia content includes at least one World Wide Web document.

28. The apparatus of claim 26, wherein the multimedia content includes at least one of a video item, an image item, a graphics item, a text item, and an audio item.

29. The apparatus of claim 26, wherein the capabilities associated with the client device include at least one of a color capability, an audio capability, a video capability, an image capability, and a text capability.

30. The apparatus of claim 26, wherein the resources associated with the client device include at least one of a screen size, a bandwidth, a storage capacity, a content wait time ability, and a payment ability.

31. An article of manufacture for adapting multimedia content to a client device, the multimedia content including one or more items and the client device having capabilities and resources associated therewith, comprising a machine readable medium containing one or more programs which when executed implement the steps of:

transcoding the multimedia content into a plurality of transcoded content versions, the plurality of transcoded content versions having different modalities and resolutions associated therewith;

filtering out the transcoded content versions that are not compatible with client device capabilities;

allocating at least a portion of the resources associated with the client device among the one or more items of the multimedia content; and selecting one or more of the transcoded versions of the multimedia content to generate a customized content based on allocation of the client device resources.

* * * * *